(12) United States Patent
Kim (10) Patent No.: US 11,420,587 B2
(45) Date of Patent: Aug. 23, 2022

(54) ANCHOR PRETENSIONER MODULE FOR SEAT BELT

(71) Applicants: Hyundai Motor Company, Seoul (KR); Kia Motors Corporation, Seoul (KR)

(72) Inventor: Dae Woon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/015,804

(22) Filed: Sep. 9, 2020

(65) Prior Publication Data

US 2021/0323499 A1 Oct. 21, 2021

(30) Foreign Application Priority Data

Apr. 21, 2020 (KR) ........................ 10-2020-0048260

(51) Int. Cl.
*B60R 22/195* (2006.01)
*B60R 21/015* (2006.01)
*B60R 21/01* (2006.01)

(52) U.S. Cl.
CPC .... *B60R 22/1952* (2013.01); *B60R 21/01554* (2014.10); *B60R 22/1954* (2013.01); *B60R 2021/01272* (2013.01)

(58) Field of Classification Search
CPC .......... B60R 22/1952; B60R 21/01554; B60R 22/1954; B60R 2021/01272; B60R 22/201; B60R 22/208
See application file for complete search history.

(56) References Cited

U.S. PATENT DOCUMENTS

| 6,769,716 | B2 | 8/2004 | Rouhana et al. | |
| 7,021,655 | B2 * | 4/2006 | Saiguchi | B60N 2/4221 |
| | | | | 280/733 |
| 7,690,292 | B2 * | 4/2010 | Woecht | B60R 22/1952 |
| | | | | 92/19 |
| 8,528,986 | B2 * | 9/2013 | Masutani | B60R 22/26 |
| | | | | 297/480 |

(Continued)

FOREIGN PATENT DOCUMENTS

| JP | 2010013096 A | * | 1/2010 | ......... B60R 22/1952 |
| JP | 2020069865 A | * | 5/2020 | ......... B60R 22/1952 |

(Continued)

*Primary Examiner* — Frank B Vanaman
(74) *Attorney, Agent, or Firm* — Fox Rothschild LLP (57) ABSTRACT

An anchor pretensioner module for a seat belt includes: an anchor which is disposed at a side of a seat cushion, and to which a tongue of the seat belt is fastened, a base which is provided at a lower side of the anchor, the base having a first operating part, which generates an explosive pressure, provided at a rear of the base, and a second operating part, which generates the explosive pressure, provided at a front of the base, a first wire which is connected to the base and the anchor, and allows the anchor to be moved downward when the first operating part is operated, and a second wire which is provided on the base, and moves the first wire while being inserted into the base when the second operating part is operated to allow the anchor to be moved forward while moving downward, so that a relative location of the anchor is moved when a collision occurs to restrain a passenger's body.

14 Claims, 8 Drawing Sheets

(56) References Cited

U.S. PATENT DOCUMENTS

| | | |
|---|---|---|
| 8,550,499 B2 | 10/2013 | Russell et al. |
| 2003/0155801 A1* | 8/2003 | Tatematsu ........... B60R 22/1951 |
| | | 297/480 |
| 2011/0012418 A1* | 1/2011 | Mages ................ B60R 22/1951 |
| | | 297/480 |
| 2016/0214554 A1* | 7/2016 | Shimazu ................ B60R 22/03 |
| 2019/0106081 A1* | 4/2019 | Hayashi .............. B60R 22/1952 |

FOREIGN PATENT DOCUMENTS

| | | |
|---|---|---|
| KR | 10-2011-0025532 A | 3/2011 |
| KR | 10-1199715 B1 | 11/2012 |
| KR | 10-1331448 B1 | 11/2013 |
| KR | 10-1356180 B1 | 1/2014 |
| KR | 10-1674496 B1 | 11/2016 |

* cited by examiner

ANCHOR PRETENSIONER MODULE FOR SEAT BELT

CROSS REFERENCE TO RELATED APPLICATION

The present application claims under 35 U.S.C. § 119(a) the benefit of Korean Patent Application No. 10-2020-0048260 filed on Apr. 21, 2020, the entire contents of which are incorporated by reference herein.

BACKGROUND

(a) Technical Field

The present disclosure relates to an anchor pretensioner module for a seat belt which restrains a passenger of a vehicle by moving a location of an anchor when an accident (e.g., a collision with one or more other vehicle(s) and/or object(s)) occurs based on a recline angle of a seat.

(b) Description of the Related Art

As vehicle technology continues to develop, the environment in which a collision may occur is also changing. Accordingly, research and development of devices for protecting a passenger from various types of accidents which may occur when a vehicle is driven has become increasingly important. A seat belt is of great importance as a device which primarily protects the passenger in the event of an accident.

The seat belt is a device which safely protects the passenger when an accident occurs (e.g., a collision with one or more vehicle(s) and/or object(s)) and should not be released unless unlatched by the passenger's operation. The seat belt typically includes a webbing, a retractor, an anchorage, a pretensioner, and a buckle.

The pretensioner serves to explode the embedded gunpowder before an air bag is operated to rewind the webbing of the seat belt and thus to fix the passenger to the seat to maintain a correct posture. The anchor pretensioner is a device which is mounted on a seat or a vehicle body to pull the webbing of the seat belt to restrain a lower limb, such as a pelvis portion of the passenger. The anchor pretensioner may be fastened to the seat belt to restrain the passenger's body more effectively.

Meanwhile, when the collision occurs, a submarine phenomenon may occur, which means that the body is pushed downward from the seat belt even when the passenger wears the seat belt. Due to the submarine phenomenon, an injury may occur such as the passenger's abdomen getting caught in the webbing.

In order to prevent the submarine phenomenon, invention device has been developed which has a function of changing an intersection angle of the anchor pretensioner when the collision occurs. In the case of the autonomous traveling vehicle, the seat arrangement and posture may be very diverse, but if the seat is reclined at a large angle, it is not sufficient to protect the passenger only with an existing anchor pretensioner. If the seat is reclined at a large angle, a restraining force of the lower body is insufficient even if the anchor pretensioner is applied, and thus the submarine phenomenon occurs, thereby increasing the likelihood of injury to the passenger.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides an anchor pretensioner module, which may determine a passenger's posture according to a recline angle of a seat of a vehicle, and be configured to be moved based on the passenger's posture to sufficiently restrain the passenger's body even if an accident occurs in a relax posture.

An anchor pretensioner module for a seat belt according to the present disclosure may include: an anchor which is disposed at a side of a seat cushion, and to which a tongue of the seat belt is fastened, a base which is provided at a lower side of the anchor, the base having a first operating part, which generates an explosive pressure, provided at a rear of the base, and a second operating part, which generates the explosive pressure, provided at a front of the base, a first wire which is connected to the base and the anchor, and allows the anchor to be moved downward when the first operating part is operated, and a second wire which is provided on the base, and moves the first wire while being inserted into the base when the second operating part is operated to allow the anchor to be moved forward while being moved downward.

The first wire may have a first end connected to the anchor, and a second end inserted into the base from the rear of the base to be connected to a front of the first operating part, and when the first operating part is operated, the second end may be moved to the front of the base (and thus the first end of the first wire is pulled), thereby allowing the anchor to be moved downward.

A cylinder connected to be slidable back and forth may be provided at a rear of an upper portion of the base, and the first wire may be inserted into the base through the cylinder and be moved forward together with the cylinder when the second operating part is operated.

The first operating part and the second operating part may be provided on the lower portion of the base, and a first end of the second wire may be connected to the cylinder and extending to the front of the base to be bent at the front of the base and then a second end of the second wire may be connected behind the location of the second operating part, and the second end of the second wire may be moved to the rear of the base when the second operating part is operated to slide the cylinder, thereby allowing the anchor to be moved forward while being moved downward.

The anchor pretensioner module may further include: a control unit which senses a recline angle of a seat to determine that the seat is in a normal posture if the recline angle is a certain angle or less and to determine that the seat is in a relax posture if the recline angle is the certain angle or more, and controls the first operating part to operate when the collision occurs in the normal posture, and the second operating part to operate when the collision occurs in the relax posture.

The first operating part may be operated when the collision occurs in the normal posture such that a relative location of the anchor to the seat may be moved downward, and the second operating part may be operated when the collision occurs in the relax posture such that the relative location of the anchor to the seat may be moved forward and downward.

Further, the base may be composed of an upper pipe which is located on an upper portion of the base and a lower pipe which is connected to the upper pipe, and located parallel to the upper pipe under the upper pipe, the first operating part may be provided at a rear of the lower pipe, and the second operating part may be provided at a front of the lower pipe, and a cylinder may be provided at a rear of the upper pipe to be connected to be slidable forward.

A first end of the first wire may be connected to the anchor to extend to penetrate the cylinder vertically and inserted into the rear of the lower pipe and then a second end of the first wire may be connected to the front of the first operating part, and a first end of the second wire may be connected to the cylinder and the second end of the first wire may be connected to the front of the second operating part through the fronts of the upper pipe and the lower pipe.

The base may include: a front cartridge which covers the front of the base and is embedded with the second operating part at a lower side of the base and a rear cartridge which covers the rear of the base and is embedded with the first operating part at the lower side of the base.

Clamps may be provided at the second end of the first wire and the second end of the second wire to allow the first wire to be moved forward when the first operating part is operated, and to allow the second wire to be inserted into the base when the second operating part is operated.

Further, the clamp may include: a plurality of balls which are discharged when the first operating part or the second wire is operated to fix the first wire or the second wire so as not to be moved in a reverse direction after the collision occurs.

The first operating part and the second operating part may be micro gas generators (MGGs).

Further, the first operating part may be provided at a center of a lower end of the base, ends of the first wire and the second wire may be connected adjacent to the first operating part, and the anchor pretensioner module may include: a gas line which is a flow path through which gas is discharged from the first operating part, is composed of a first line which is connected to a rear of the end of the first wire and a second line which is connected to a rear of the end of the second wire, and includes: a valve which may block the flow of fluid to control the discharge path of gas.

The anchor pretensioner module may further include: a control unit which senses a recline angle of a seat to determine that the seat is in a normal posture if the recline angle is a certain angle or less, and to determine that the seat is in a relax posture if the recline angle is the certain angle or more, and controls the valve to allow the gas to flow to the rear of the end of the first wire through the first line when the collision occurs in the normal posture, and to allow the gas to flow to the rear of the end of the second wire through the second line when the collision occurs in the relax posture.

According to the anchor pretensioner module according to the present disclosure, the anchor pretensioner module may move based on the passenger's posture to effectively restrain the passenger's body even if the collision occurs in the relax posture as well as in the normal posture, thereby preventing the submarine phenomenon.

Further, the anchor pretensioner module may be easily manufactured and assembled due to the simple structure, and may be operated and then easily replaced after the collision occurs.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural to functional descriptions of the exemplary embodiments of the present disclosure disclosed in the present specification or application are only illustrated for the purpose of describing the exemplary embodiments according to the present disclosure, and the exemplary embodiments according to the present disclosure may be embodied in various forms and it should not be construed that the present disclosure is limited to the exemplary embodiments described in the present specification or application.

Since the exemplary embodiments according to the present disclosure may be variously changed and have various forms, specific exemplary embodiments will be illustrated in the drawings and described in detail in the present specification or application. However, this is not intended to limit the exemplary embodiments according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

Hereinafter, the present disclosure will be described in detail by explaining preferred exemplary embodiments of the present disclosure with reference to the accompanying drawings. The same reference numerals in each drawing denote the same members.

A pretensioner is a component of a seat belt, and serves to explode the embedded gunpowder when a collision occurs to rewind a webbing of the seat belt and thus to fix the passenger to a seat to maintain a correct posture. The passenger may be protected by an operation of the pretensioner. However, as described above, if the seat is relaxed at a certain angle or more, a submarine phenomenon may occur even if the pretensioner is operated.

The present disclosure is related to an anchor pretensioner, which may operate a first operating part 201 if the seat is in a normal posture, and operate a second operating part 202 if the seat is in a relax posture, thus operating the first operating part 201 and/or the second operating part 202 based on the passenger's posture, thereby effectively protecting the passenger in the event of a collision.

Figure 1:
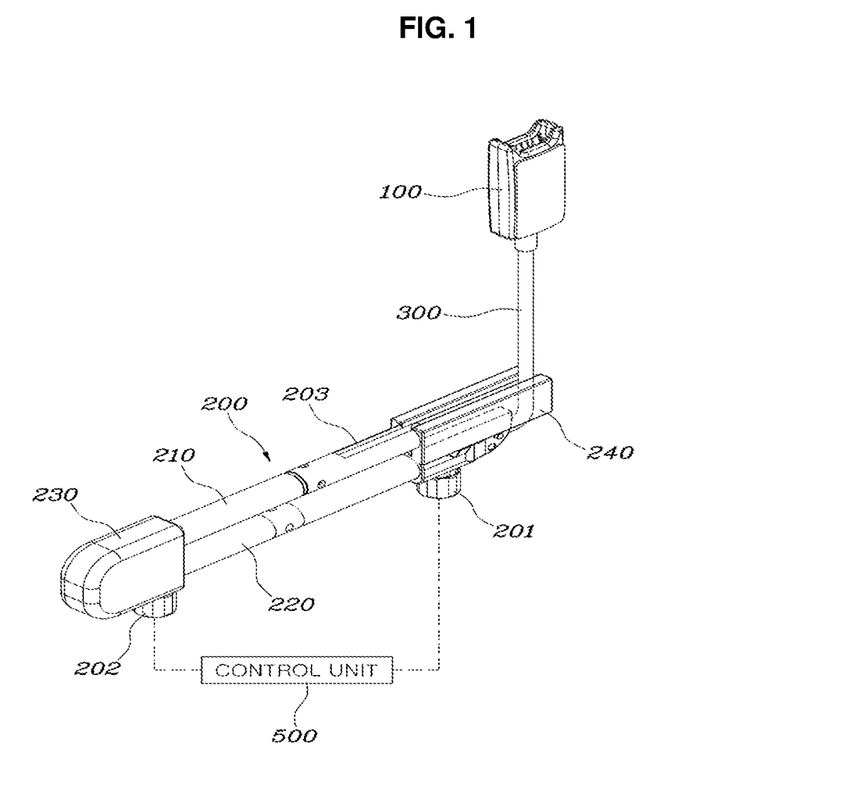
FIG. 1 is a perspective diagram illustrating an anchor pretensioner module according to an exemplary embodiment of the present disclosure.
Figure 2:
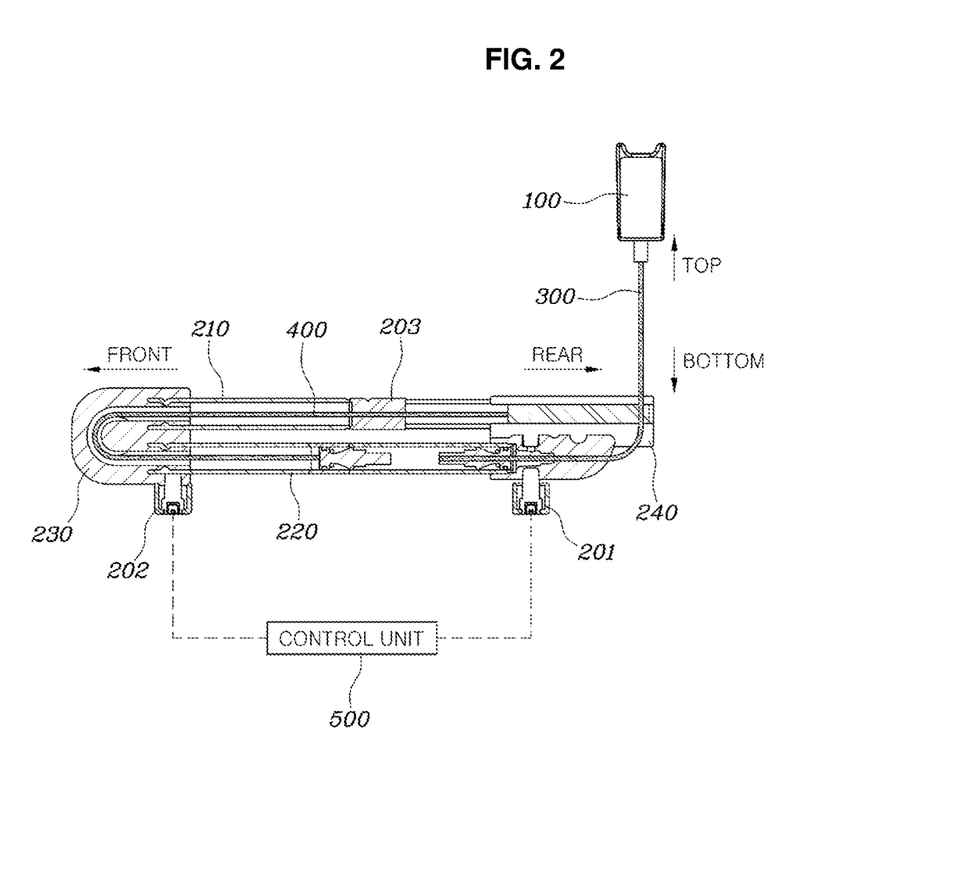
FIG. 2 is a cross-sectional diagram illustrating the anchor pretensioner module according to an exemplary embodiment of the present disclosure.

FIG. 1 is a perspective diagram of an anchor pretensioner module according to an exemplary embodiment of the present disclosure, and FIG. 2 is a cross-sectional diagram of the anchor pretensioner module according to an exemplary embodiment of the present disclosure. Referring to FIGS. 1 and 2, the anchor pretensioner module according to an exemplary embodiment of the present disclosure may be composed of an anchor 100, a base 200, a first wire 300, and a second wire 400.

The anchor 100 is a device in which a tongue of the seat belt is fastened and fixed. The anchor 100 may be disposed at the side of a seat cushion.

The base 200 may be provided below the anchor 100. The anchor 100 and the base 200 may be connected by the first wire 300 extending downward from the anchor 100. The base 200 may be disposed at the side of a seat.

The base 200 may be provided with the first operating part 201 and the second operating part 202 for generating an explosion pressure. The first operating part 201 and the second operating part 202 may be micro gas generators (MGGs) which supply high-pressure gas when a collision occurs. The first operating part 201 may be provided at a rear of the base 200, and the second operating part 202 may be provided at a front of the base 200. That is, the second operating part 202 may be provided at a point spaced apart from the location of the first operating part 201 forward.

A cylinder 203 may be provided at a rear of an upper portion of the base 200. The cylinder 203 may be connected to the upper portion of the base 200 to be slidable back and forth.

The first wire 300 may be connected to the anchor 100 and the base 200, and the second wire 400 may be provided inside the base 200. A relative location to the seat of the anchor 100 is changed by the first wire 300 and the second wire 400 when a collision occurs.

Figure 3:
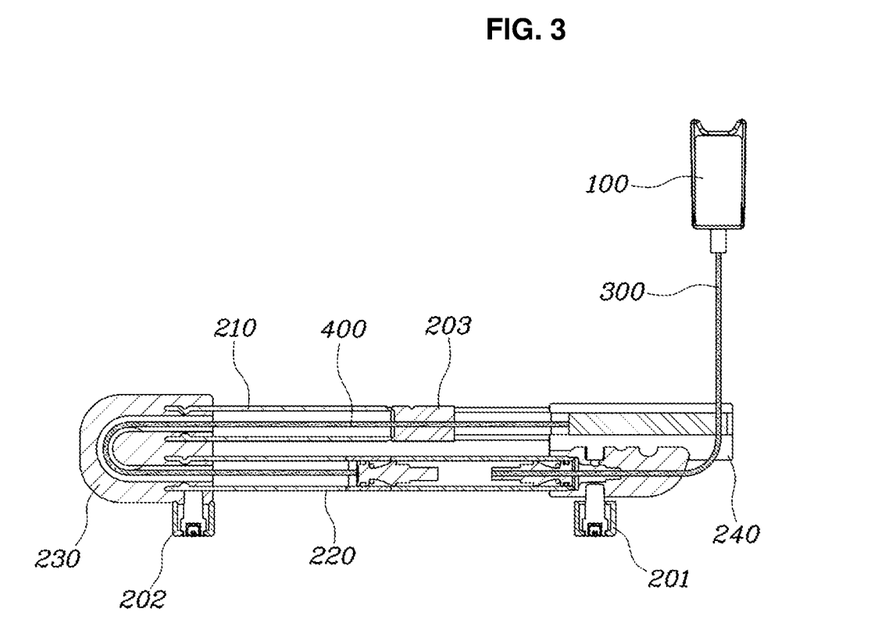
FIGS. 3 and 4 are diagrams illustrating changes in the location of an anchor if a first operating part of the anchor pretensioner module according to an exemplary embodiment of the present disclosure is operated.
Figure 4:
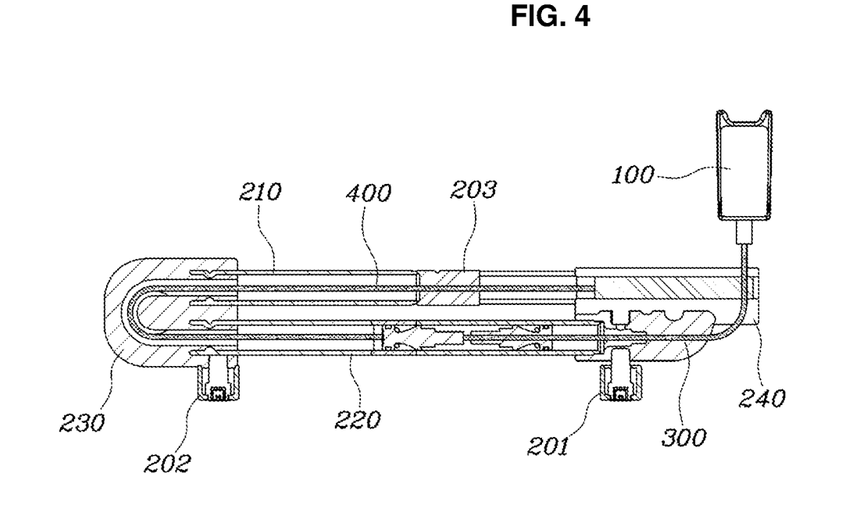

FIGS. 3 and 4 are diagrams illustrating changes in the location of the anchor 100 if the first operating part 201 of the anchor pretensioner module according to an exemplary embodiment of the present disclosure is operated.

Referring to FIGS. 3 and 4, the first wire 300 may be connected to the base 200 and the anchor 100. Specifically, a first end of the first wire 300 may be connected to the anchor 100, and a second end of the first wire 300 may be inserted into the interior of the base 200 from the rear of the base 200. The second end of the first wire 300 may be connected to the front of the location of the first operating part 201. When the first operating part 201 is operated, the second end of the first wire 300 is moved to the front of the base 200 and the first end of the first wire 300 is pulled, such that the anchor 100 may be moved downward.

Figure 5:
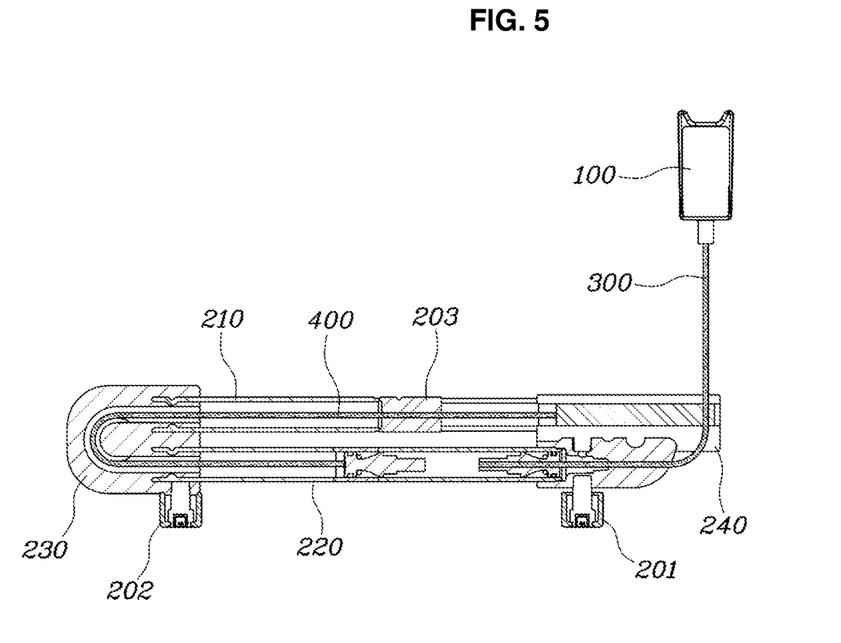
FIGS. 5 and 6 are diagrams illustrating changes in the location of an anchor if a second operating part of the anchor pretensioner module according to an exemplary embodiment of the present disclosure is operated.
Figure 6:
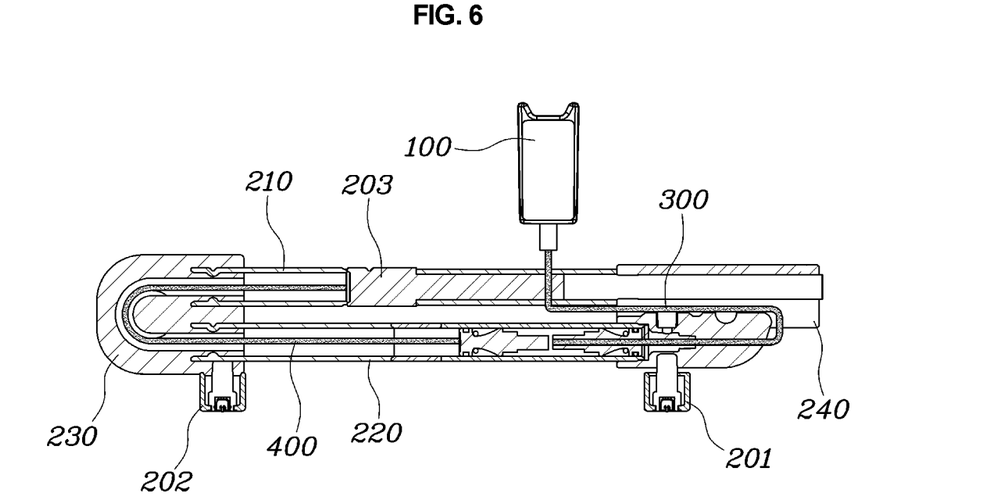

FIGS. 5 and 6 are diagrams illustrating changes in the location of the anchor 100 if the second operating part 202 of the anchor pretensioner module according to an exemplary embodiment of the present disclosure is operated.

The second wire 400 may be provided inside the base 200. A first end of the second wire 400 may be connected to the cylinder 203. Since the cylinder 203 is provided at the rear of the upper portion of the base 200, the first end of the second wire 400 is connected to the base 200 at the rear of the upper portion of the base 200. The second wire 400 may extend to the front of the base 200 to be bent at the front of the base 200 and then the second end of the second wire 400 may be connected behind the location of the second operating part 202. That is, the first end of the second wire 400 may be located at the rear of the upper portion of the base 200, the second end of the second wire 400 may be located at the rear of the lower portion of the base 200, and an intermediate point may be formed in a shape which is bent at the front of the base 200.

When the second operating part 202 is operated, the second end of the second wire 400 is moved to the rear of the base 200, and the first end of the second wire 400 is moved to the front of the base 200. The cylinder 203 connected to the first end of the second wire 400 is slid forward, and since the first wire 300 penetrates the cylinder 203, the first wire 300 is moved downward while being moved forward. Accordingly, the anchor 100 is moved forward and downward.

The first wire 300 may be inserted into the base 200 through the cylinder 203 at the lower surface of the anchor 100. Accordingly, when the cylinder 203 is slid forward, the location of the anchor 100 may be moved forward while the first wire 300 is also moved forward together.

Further, as illustrated in FIGS. 1 and 2, the anchor pretensioner module according to an exemplary embodiment of the present disclosure may further include a control unit 500. The control unit 500 may sense a recline angle of the seat to determine that the seat is in a normal posture if the recline angle is a certain angle or less, and to determine that the seat is in a relax posture if the recline angle is the certain angle or more.

The control unit 500 may control the first operating part 201 to operate when a collision occurs if the control unit 500 determines that the seat is in the normal posture, and control the second operating part 202 to operate when the collision occurs if the control unit 500 determines that the seat is in the relax posture. Accordingly, when the collision occurs in the normal posture, the relative location of the anchor 100 to the seat is moved downward by the first operating part 201. Further, when the collision occurs in the relax posture, the relative location of the anchor 100 to the seat is moved forward and downward by the operation of the second operating part 202.

Meanwhile, referring to FIGS. 1 to 6, the base 200 may be composed of an upper pipe 210 and a lower pipe 220. The upper portion of the base 200 may be formed of the upper pipe 210, and the lower pipe 220 may be located parallel to the upper pipe 210 under the upper pipe 210. The first operating part 201 may be provided at the rear of the lower pipe 220, and the second operating part 202 may be provided at the front of the lower pipe 220. The fronts of the upper pipe 210 and the lower pipe 220 may be connected to each other and the interiors thereof may be communicated with each other. The cylinder 203 may be provided at the rear of the upper pipe 210 to be connected to be slidable forward.

If the base 200 is composed of the upper pipe 210 and the lower pipe 220, the first end of the first wire 300 may be connected to the anchor 100 to extend to penetrate the cylinder 203 vertically and inserted into the rear of the lower pipe 220 and then the second end of the first wire 300 may be connected to the front of the location of the first operating part 201. The first end of the second wire 400 may be connected to the cylinder 203 and the second end of the second wire 400 may be connected to the front of the location of the second operating part 202 through the fronts of the upper pipe 210 and the lower pipe 220.

Further, the base 200 may include a front cartridge 230 which covers the front and a rear cartridge 240 which covers the rear. The second operating part 202 may be embedded in the lower side of the front cartridge 230, and the first operating part 201 may be embedded in the lower side of the rear cartridge 240. The front cartridge 230 and the rear cartridge 240 may protect the base 200 to prevent the first wire 300 and the second wire 400 from being interfered by the outside. Further, since the front cartridge 230 and the second cartridge 240 may be easily separated and replaced if a collision occurs and the front cartridge 230 and the second cartridge 240 are replaced after being operated, there is an advantage of easy replacement.

Figure 7:
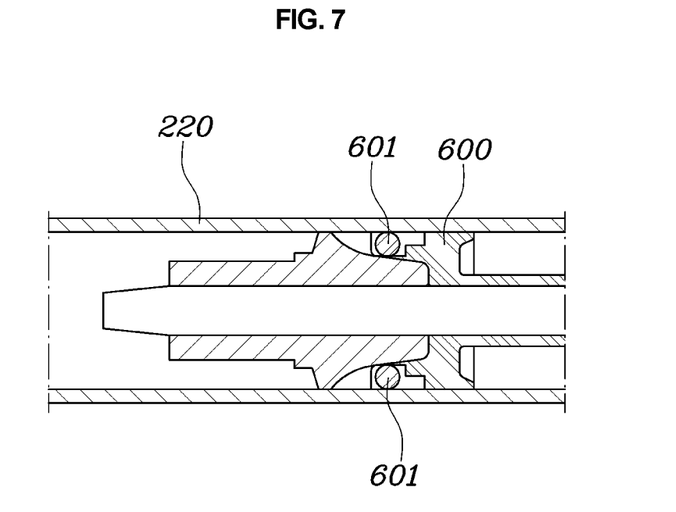
FIGS. 7 and 8 are diagrams illustrating states where a wire of the anchor pretensioner module according to an exemplary embodiment of the present disclosure is fixed.
Figure 8:
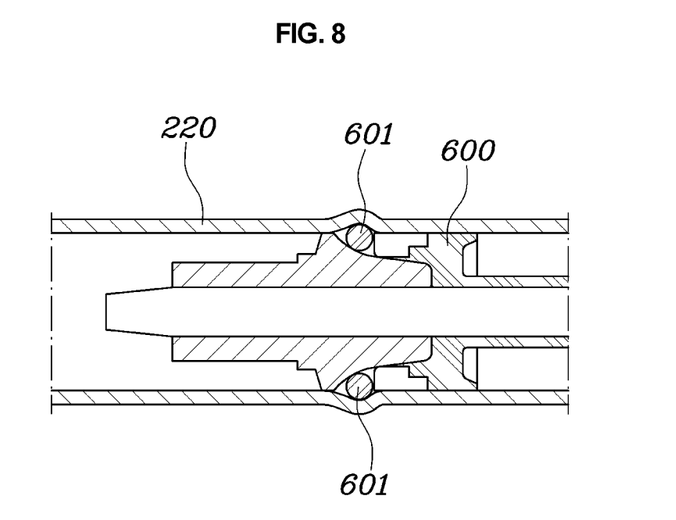

FIGS. 7 and 8 are diagrams illustrating states where the wire of the anchor pretensioner module according to an exemplary embodiment of the present disclosure is fixed.

Referring to FIGS. 7 and 8, clamps 600 may be provided at the other ends of the first wire 300 and the second wire 400 according to an exemplary embodiment of the present disclosure. When the first operating part 201 is operated, the first wire 300 may be moved forward by the clamp 600. When the second operating part 202 is operated, the second wire 400 may be inserted into the base 200 by the clamp 600. It is possible to stably perform the behavior of the anchor 100 by the optional operation of the first operating part 201 and the second operating part 202 by the clamp 600.

A plurality of balls 601 may be provided in the clamp 600. If the first operating part 201 or the second operating part 202 is operated, the plurality of balls 601 are separated from the clamp 600 to prevent the first wire 300 or the second wire 400 from being moved to the opposite side. That is, the ball 601 may perform a function of fixing the wire. When a collision occurs, the passenger loses his/her balance and is supported by the webbing, such that the passenger's weight is transferred to the webbing. Since the wire may be moved in the opposite direction by the weight transferred to the webbing, the ball 601 is separated from the clamp 600 to fix the wire not to be moved in the opposite direction.

Figure 9:
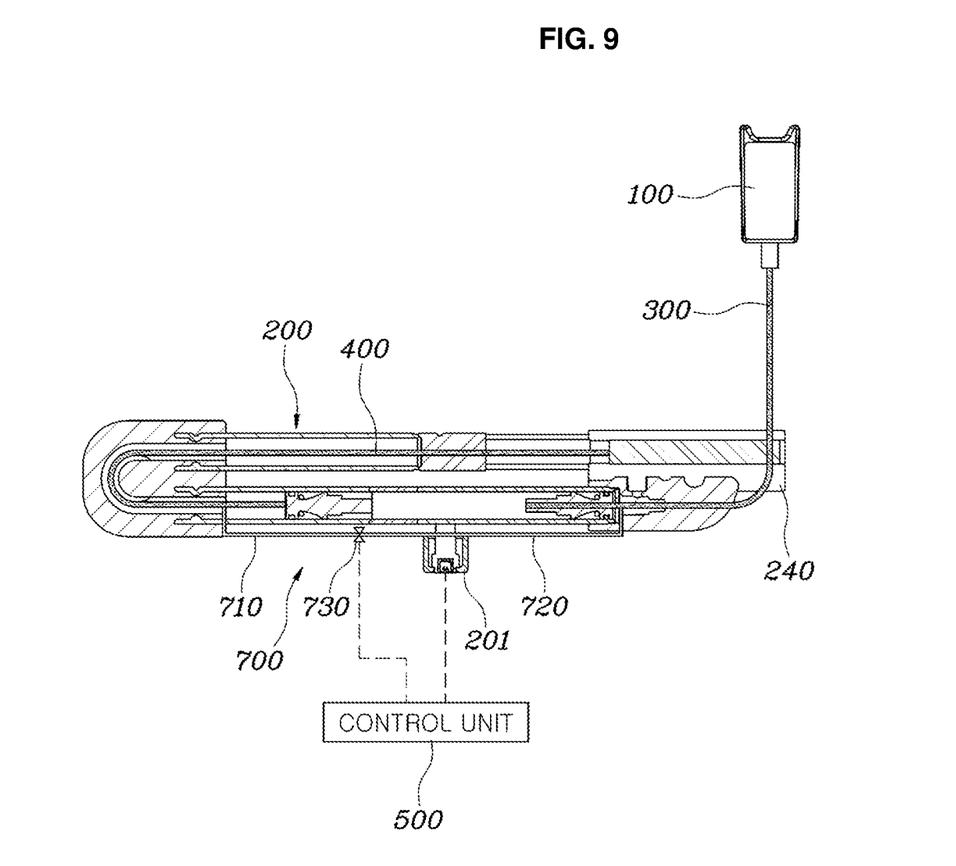
FIG. 9 is a cross-sectional diagram of an anchor pretensioner module according to another exemplary embodiment of the present disclosure.

FIG. 9 is a cross-sectional diagram of an anchor pretensioner module according to another exemplary embodiment of the present disclosure.

Referring to FIG. 9, the anchor pretensioner module according to another exemplary embodiment of the present disclosure is provided with one operating part, e.g., the first operating part 201 on the center of the lower end of the base 200, and the ends of the first wire 300 and the second wire 400 may be connected adjacent to the operating part. Further, the anchor pretensioner module may further include a gas line 700, which is a flow path through which gas discharged from the operating part flows.

The gas line 700 is a flow path through which gas is discharged from the operating part, and may be composed of a first line 710 and a second line 720. The first line 710 is connected to the rear of the first wire 300, and the second line 720 is connected to the rear of the second wire 400. The gas line 700 may be provided with a valve 730 which may block the flow of fluid. As illustrated in FIG. 6, the valve 730 may also be provided on one of the first line 710 or the second line 720, and may also be provided on both the first line 710 and the second line 720.

The control unit 500 of the pretensioner module according to another exemplary embodiment of the present disclosure may control the valve 730. When a collision occurs in the normal posture, the control unit 500 may control the gas to flow to the rear of the end of the first wire 300 through the first line 710 so that the first wire 300 is moved to the front of the base 200. Accordingly, the anchor 100 may be moved downward.

Further, when a collision occurs in the relax posture, the control unit 500 may control the gas to flow to the rear of the end of the second wire 400 through the second line 720 so that the second wire 400 is moved to the rear of the base 200. Accordingly, the anchor 100 may be moved downward and forward.

The seating posture of the passenger is usually a normal posture in many cases, but when conveniently resting, the passenger reclines the seat to take a relax posture in some cases. Particularly, in the case of an autonomous vehicle, since a situation in which the passenger intervenes in the driving operation is decreased, it is expected that the passenger reclines the seat to sit in the vehicle in order to rest comfortably in many cases.

If the seat is reclined at a certain angle or more, a restraining force of the lower body is insufficient and thus a submarine phenomenon may occur when a collision occurs. If the submarine phenomenon occurs, even the passenger wearing a seat belt may be seriously injured. Particularly, since the seatback is lying in the relax posture, the force pushed forward when the collision occurs increases. Accordingly, since the probability of occurrence of the submarine phenomenon increases, it is necessary to increase the restraining force in the relax posture.

In the case of the anchor pretensioner module according to the present disclosure, when the collision occurs in the normal posture, the location of the anchor 100 may be moved downward to increase the restraining force of the lower limb. Particularly, in the case of the relax posture, the location of the anchor 100 is moved forward while being moved downward, thereby preventing the phenomenon in which the passenger is pushed forward. By increasing the restraining force for the passenger according to the change in the location of the anchor 100, it is possible to minimize the injury. The restraining force for the webbing to restrain the pelvis of the passenger is increased while the anchor 100 is moved forward in the relax posture.

While the specific exemplary embodiments of the present disclosure have been illustrated and described, it will be apparent to those skilled in the art that various improvements and changes of the present disclosure are possible without departing from the technical spirit of the present disclosure provided by the appended claims.

What is claimed is:

1. An anchor pretensioner module for a seat belt, comprising:
    an anchor which is disposed at a side of a seat cushion, and to which a tongue of the seat belt is fastened;
    a base which is provided at a lower side of the anchor, the base having a first operating part, which generates an explosive pressure, provided at a rear of the base, and a second operating part, which generates the explosive pressure, provided at a front of the base;
    a first wire which is connected to the base and the anchor, and allows the anchor to be moved downward when the first operating part is operated; and
    a second wire which is provided on the base, and moves the first wire while being inserted into the base when the second operating part is operated to allow the anchor to be moved forward while being moved downward,
    wherein the anchor is moved with respect to a seat to restrain a passenger's body when a collision occurs.

2. The anchor pretensioner module according to claim 1, wherein the first wire has a first end connected to the anchor, and a second end inserted into the base from the rear of the base to be connected to a front of the first operating part, and when the first operating part is operated, the second end is moved to the front of the base, thereby allowing the anchor to be moved downward.

3. The anchor pretensioner module according to claim 1, wherein a cylinder connected to be slidable back and forth is provided at a rear of an upper portion of the base, and the first wire is inserted into the base through the cylinder and is moved forward together with the cylinder when the second operating part is operated.

4. The anchor pretensioner module according to claim 3, wherein the first operating part and the second operating part are provided on a lower portion of the base, and wherein the first end of the second wire is connected to the cylinder and extending to the front of the base to be bent at the front of the base and then the second end of the second wire is connected behind the second operating part, and the second end thereof is moved to the rear of the base when the second operating part is operated to slide the cylinder, thereby allowing the anchor to be moved forward while being moved downward.

5. The anchor pretensioner module according to claim 1, further comprising:
    a control unit which senses a recline angle of the seat to determine that the seat is in a normal posture if the recline angle is a certain angle or less and to determine that the seat is in a relax posture if the recline angle is the certain angle or more, and controls the first operating part to operate when the collision occurs in the normal posture, and the second operating part to operate when the collision occurs in the relax posture.

6. The anchor pretensioner module according to claim 5, wherein the first operating part is operated when the collision occurs in the normal posture such that the anchor is moved downward with respect to the seat, and the second operating part is operated when the collision occurs in the relax posture such that the anchor is moved forward and downward with respect to the seat.

7. The anchor pretensioner module according to claim 1, wherein the base is composed of an upper pipe which is located on an upper portion of the base and a lower pipe which is connected to the upper pipe, and located parallel to the upper pipe under the upper pipe, the first operating part is provided at a rear of the lower pipe, and the second operating part is provided at a front of the lower pipe, and
    wherein a cylinder is provided at a rear of the upper pipe to be connected to be slidable forward.

8. The anchor pretensioner module according to claim 7, wherein a first end of the first wire is connected to the anchor to extend to penetrate the cylinder vertically and is inserted into the rear of the lower pipe and then a second end of the first wire is connected to the front of the first operating part, and a first end of the second wire is connected to the cylinder and a second end of the second wire is connected to the front of the second operating part through the fronts of the upper pipe and the lower pipe.

9. The anchor pretensioner module according to claim 7, wherein the base comprises: a front cartridge which covers the front of the base and is embedded with the second operating part at a lower side of the base and a rear cartridge which covers the rear of the base and is embedded with the first operating part at a lower side of the base.

10. The anchor pretensioner module according to claim 1, wherein clamps are provided at a second end of the first wire and a second end of the second wire to allow the first wire to be moved forward when the first operating part is operated, and to allow the second wire to be inserted into the base when the second operating part is operated.

11. The anchor pretensioner module according to claim 10, wherein each of the clamps comprises: a plurality of balls which are discharged when the first operating part or the second operating part is operated to fix the first wire or the second wire so as not to be moved in a reverse direction after the collision occurs.

12. The anchor pretensioner module according to claim 1, wherein the first operating part and the second operating part are micro gas generators.

13. An anchor pretensioner module for a seat belt, comprising:
   an anchor which is disposed at a side of a seat cushion, and to which a tongue of the seat belt is fastened;
   a base which is provided at a lower side of the anchor, the base having a first operating part, which generates an explosive pressure;
   a first wire which is connected to the base and the anchor, and allows the anchor to be moved downward when the first operating part is operated; and
   a second wire which is provided on the base,
   wherein the first operating part is provided at a center of a lower end of the base,
   wherein ends of the first wire and the second wire are connected adjacent to the first operating part, and
   wherein the anchor pretensioner module comprises:
   a gas line which is a flow path through which gas is discharged from the first operating part, is composed of a first line which is connected to a rear of the end of the first wire and a second line which is connected to a rear of the end of the second wire, and comprises: a valve which blocks a flow of fluid to control the discharge path of gas.

14. The anchor pretensioner module according to claim 13, further comprising:
   a control unit which senses a recline angle of a seat to determine that the seat is in a normal posture if the recline angle is a certain angle or less, and to determine that the seat is in a relax posture if the recline angle is the certain angle or more, and controls the valve to allow the gas to flow to the rear of the end of the first wire through the first line when the collision occurs in the normal posture, and to allow the gas to flow to the rear of the end of the second wire through the second line when the collision occurs in the relax posture.

* * * * *